United States Patent [19]

Evans

[11] Patent Number: 5,752,586
[45] Date of Patent: May 19, 1998

[54] BRAKE SHOE WEAR AND ADJUSTER MALFUNCTION INDICATING DEVICE FOR DRUM BRAKE ASSEMBLY

[75] Inventor: Anthony C. Evans, Northville, Mich.

[73] Assignee: Kelsey-Hayes Company, Livonia, Mich.

[21] Appl. No.: 701,059

[22] Filed: Aug. 22, 1996

[51] Int. Cl.⁶ .................................................. F16D 66/00
[52] U.S. Cl. ............................... 188/1.11; 188/79.56
[58] Field of Search .................. 188/1.11 W, 1.11 WE, 188/1.11 E, 79.56, 79.61, 325–327, 331, 333, 334; 116/67 R, 208; 340/454

[56] References Cited

U.S. PATENT DOCUMENTS

| | | |
|---|---|---|
| 2,835,757 | 5/1958 | Chellemi et al. ............... 340/454 |
| 3,213,971 | 10/1965 | Moyer et al. . |
| 3,282,241 | 11/1966 | Forbush . |
| 3,339,676 | 9/1967 | Quinn . |
| 3,363,232 | 1/1968 | Mizsak ................................. 340/454 |
| 3,502,180 | 3/1970 | Aiki et al. . |
| 3,605,085 | 9/1971 | Fiorita . |
| 3,628,008 | 12/1971 | Lacey . |
| 3,722,629 | 3/1973 | Totschnig . |
| 3,776,329 | 12/1973 | Hope et al. . |
| 3,887,040 | 6/1975 | Simon et al. . |
| 3,943,486 | 3/1976 | Hayashida et al. . |
| 4,217,973 | 8/1980 | Johns et al. . |
| 4,706,783 | 11/1987 | Rath et al. ........................ 188/79.56 |
| 5,092,428 | 3/1992 | Kobayashi et al. ................... 188/326 |

*Primary Examiner*—Chris Schwartz
*Attorney, Agent, or Firm*—MacMillan, Sobanski & Todd

[57] ABSTRACT

An improved drum brake assembly wherein the operating condition of the brake shoes and the automatic brake adjusting mechanism can be determined without removing any component from the associated vehicle includes a backing plate, a brake drum, and first and second brake shoes supported on the backing plate and movable into frictional engagement with the brake drum. Each of the first and second brake shoes includes a web portion, a table portion secured to the web portion, and a friction pad secured to the table portion. The drum brake assembly further includes a service brake mechanism for selectively moving the to brake shoes into frictional engagement with the brake drum, a parking and emergency brake mechanism for selectively moving the brake shoes into frictional engagement with the brake drum, and an automatic brake adjusting mechanism carried by the brake assembly and operatively connected to said first and second brake shoes. The drum brake assembly further includes a device for indicating the operating condition of the brake shoes and for indicating the operating condition of the automatic brake adjusting mechanism.

17 Claims, 7 Drawing Sheets

BRAKE SHOE WEAR AND ADJUSTER MALFUNCTION INDICATING DEVICE FOR DRUM BRAKE ASSEMBLY

BACKGROUND OF THE INVENTION

This invention relates in general to vehicle drum brake assemblies and in particular to an improved brake shoe wear and adjuster malfunction indicating device for use in such a vehicle drum brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies can be actuated by hydraulic, pneumatic, or mechanical pressure generated by an operator of the vehicle depressing a foot pedal, pulling a hand lever, and the like. The structure and operation of both drum brake assemblies and disc brake assemblies, as well as the actuators therefor, are well known in the art.

A typical drum brake assembly includes a backing plate which is secured to a fixed, non-rotatable component of the vehicle, such as the vehicle axle housing. A pair of opposed arcuate brake shoes are supported on the backing plate for selective movement relative thereto. Each of the brake shoes has a friction pad or lining secured thereto. The brake drum assembly further includes a hollow cylindrical brake drum which is secured to the vehicle wheel for rotation therewith. The hollow interior of the brake drum defines an inner cylindrical braking surface. The brake drum is disposed adjacent to the backing plate such that the brake shoes extend within the cylindrical braking surface. To effect braking action, the brake shoes are moved outwardly apart from one another such that the friction pads frictionally engage the cylindrical braking surface of the brake drum. Such frictional engagement causes slowing or stopping of the rotational movement of the brake drum and, therefore, the wheel of the vehicle in a controlled manner.

One or more actuating mechanisms are provided in the brake drum assembly for selectively moving the brake shoes outwardly apart from one another into frictional engagement with the cylindrical braking surface of the brake drum. Usually, a hydraulically or pneumatically actuated service brake mechanism is provided for selectively actuating the drum brake assembly under normal operating conditions. Such a service brake mechanism can include a hydraulic cylinder having a pair of opposed pistons which abut and move the brake shoes apart from one another into frictional engagement with the cylindrical braking surface of the brake drum. A mechanically actuated parking and emergency brake mechanism is also usually provided for selectively actuating the drum brake assembly. The parking and service brake mechanism can include an actuating lever pivotally supported on one of the brake shoes. The actuating lever is connected to a cable which, when pulled, moves the brake shoes apart from one another into frictional engagement with the cylindrical braking surface of the brake drum.

When the drum brake assembly is actuated, the friction pads of the brake shoes frictionally engage the brake drum. As a result, the friction pads of the brake shoes wear thinner. Eventually, the friction pads of the brake shoes wear too thin and should be replaced to maintain effective braking performance. Because the brake shoes are not readily visible (usually the vehicle wheel and brake drum must first be removed), the amount of wear of the friction pads of the brake shoes cannot be easily checked. Thus, it would be desirable to be able to determine if the brake shoes need to be replaced without having to remove the vehicle wheel and brake drum. U.S. Pat. No. 3,213,971 to Moyer et al., U.S. Pat. No. 3,282,241 to Forbush, U.S. Pat. No. 3,339,676 to Quinn, U.S. Pat. No. 3,502,180 to Aiki et al., U.S. Pat. No. 3,605,085 to Florita, U.S. Pat. No. 3,628,008 to Lacey, U.S. Pat. No. 3,722,629 to Totsching, U.S. Pat. No. 3,776,329 to Hope et al., U.S. Pat. No. 3,887,040 to Simon, U.S. Pat. No. 3,943,486 to Hayashida, and U.S. Pat. No. 4,217,973 to Johns et al. all disclose prior art devices for indicating brake shoe wear in a drum brake assembly. U.S. Pat. No. 3,776,329 to Hope et al. discloses a prior art device which indicates brake shoe wear in a drum brake assembly and/or that the brake operating mechanism is out of adjustment.

Also, when the drum brake assembly is not actuated, it is desirable to maintain a predetermined clearance between the friction pads of the brake shoes and the cylindrical braking surface of the brake drum. In order to maintain this predetermined clearance, the drum brake assembly typically includes an automatic brake adjusting mechanism. The brake adjusting mechanism is effective to move the brake shoes outwardly as the friction pads of the brake shoes wear so at to maintain the predetermined clearance. If the brake adjusting mechanism is not functioning properly, the braking performance of the vehicle can be affected. Since the brake adjusting mechanism is also not readily visible unless the vehicle wheel and brake drum are first removed, the condition of the brake adjusting mechanism cannot be easily checked. Thus, it would be desirable to be able to determine if the automatic brake adjusting mechanism is functioning properly without having to remove the vehicle wheel and brake drum.

SUMMARY OF THE INVENTION

This invention relates to an improved drum brake assembly wherein the wear of the brake shoes and the condition of the automatic brake adjusting mechanism can be easily determined without removing any component from the associated vehicle. The drum brake assembly includes a backing plate, a brake drum, and first and second brake shoes supported on the backing plate which are movable into frictional engagement with the brake drum. Each of the first and second brake shoes includes a web portion, a table portion secured to the web portion, and a friction pad secured to the table portion. The drum brake assembly further includes a service brake mechanism for selectively moving the brake shoes into frictional engagement with the brake drum, a parking and emergency brake mechanism for selectively moving the brake shoes into frictional engagement with the brake drum, and an automatic brake adjusting mechanism carried by the brake assembly and operatively connected to said first and second brake shoes. The drum brake assembly further includes means for indicating the operating condition of the brake shoes and for indicating the operating condition of the automatic brake adjusting mechanism.

Various objects and advantages of this invention will become apparent to those skilled in the art from the following detailed description of the preferred embodiment, when read in light of the accompanying drawings.

BRIEF DESCRIPTION OF THE DRAWINGS

FIGS. 10 through 12 are views similar to FIGS. 7 through 9 illustrating the positions of the brake shoe wear and brake adjusting indicating device when the brake adjusting mechanism is not properly functioning.

FIGS. 10A through 12A are views similar to FIGS. 7A through 9A illustrating the positions of the arm of the indication dial of the brake shoe wear and brake adjusting indicating device when the brake adjusting mechanism is not properly functioning.

DETAILED DESCRIPTION OF THE PREFERRED EMBODIMENTS

Figure 1:
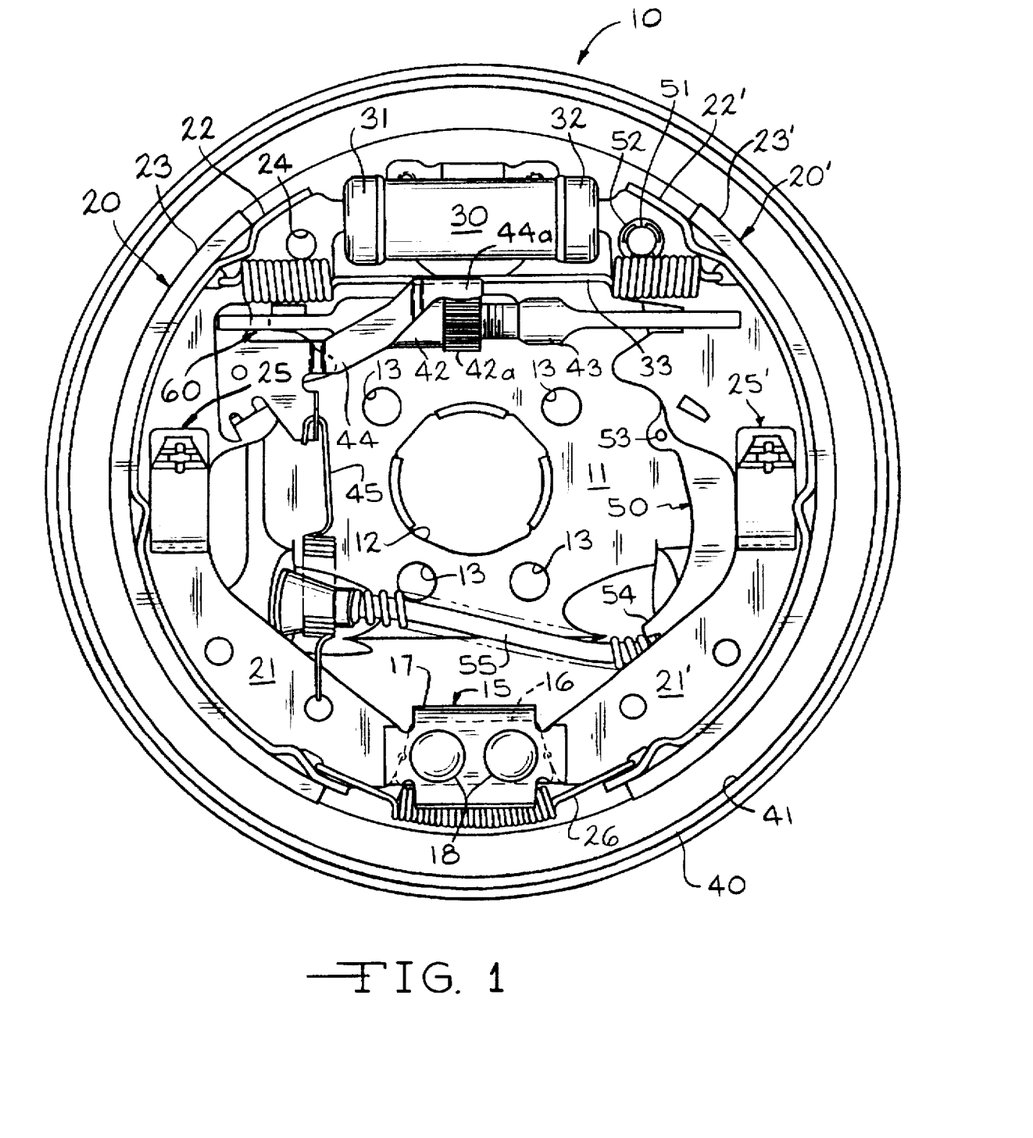
FIG. 1 is a side elevational view of a portion of a drum brake assembly including a brake shoe wear and automatic brake adjusting indicating device in accordance with the present invention.
Figure 2:
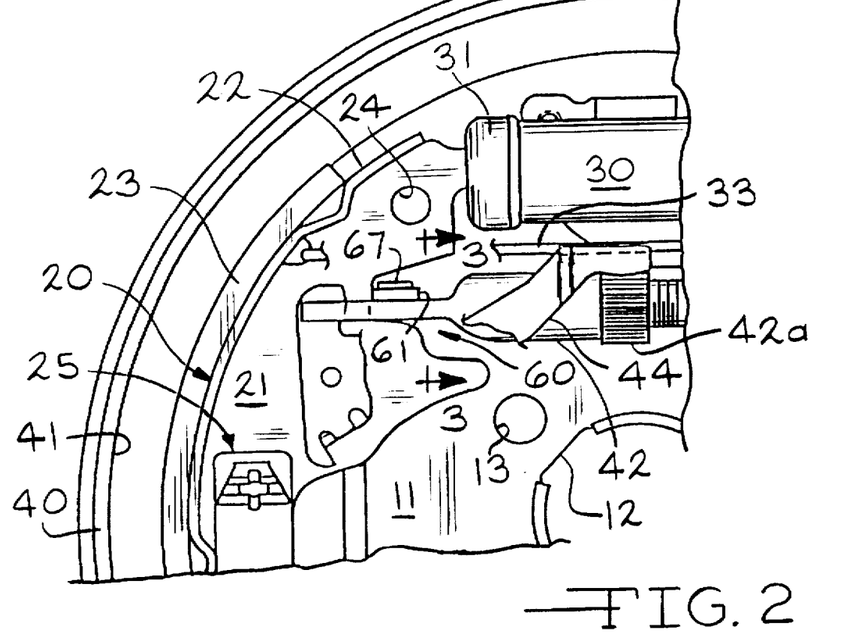
FIG. 2 is an enlarged view, partially broken away, of a portion of the drum brake assembly illustrated in FIG. 1.

Referring now to the drawings, there is illustrated in FIG. 1 a portion of a drum brake assembly, indicated generally at 10, in accordance with this invention. The illustrated drum brake assembly 10 is associated with a left rear wheel (not shown) of a vehicle. The general structure and operation of the drum brake assembly 10 is conventional in the art. Thus, only those portions of the drum brake assembly 10 which are necessary for a full understanding of this invention will be explained and illustrated in detail. Although this invention will be described and illustrated in conjunction with the particular vehicle drum brake assembly disclosed herein, it will be appreciated that this invention may be used in conjunction with other drum and disc brake assemblies.

The illustrated drum brake assembly 10 includes a rigid backing plate 11 which is generally flat and circular in shape. The backing plate 11 is adapted to secured to a fixed, non-rotatable component of the vehicle, such as an outer end of a housing (not shown) for enclosing a rotatable axle. To accomplish this, a relatively large opening 12 is formed through the central portion of the backing plate 11. The central opening 12 is provided to permit the outer end of the rotatable axle (not shown) to extend therethrough to the driven vehicle wheel (not shown). A plurality of relative small holes 13 are also formed through the backing plate 12, located about the central opening 12. The small holes 13 are provided to permit threaded bolts (not shown) to extend therethrough to secure the backing plate 12 to the outer end of the axle.

An abutment block assembly, indicated generally at 15, is provided on the outer surface of the backing plate 11. The abutment block assembly 15 includes an inner spacer plate 16, which is disposed adjacent to the outer surface of the backing plate 11, and an outer retainer plate 17, which is disposed adjacent to the spacer plate 16. The spacer plate 16 and the retainer plate 17 are secured to the backing plate 11 by a pair of rivets 18 or similar fasteners which extend therethrough to the inner surface of the backing plate 11.

The drum brake assembly 10 includes first and second brake shoes, indicated generally at 20 and 20'. Structurally, the brake shoes 20 and 20' are essentially mirror images of one another, and like reference numbers are used to indicate similar parts. The brake shoes 20 and 20' include respective web portions 21 and 21' which are generally flat and crescent-shaped. Arcuate table portions 22 and 22' are secured to the opposed outer curved surfaces of the web portions 21 and 21', such as by welding. A friction pad 23 is secured to the outer lo arcuate surface of the table portion 22 of the brake shoe 20, while a friction pad 23' is secured to the outer arcuate surface of the table portion 22' of the brake shoe 20'. A circular aperture 24 is formed through the upper end of the web portion 21 of the brake shoe 20, and a similar aperture (not shown) is formed through the upper end of the web portion 21' of the brake shoe 20' for a purpose which will be explained below.

The first and second brake shoes 20 and 20' are supported on the backing plate 11 by respective pivot pin and spring-clip assemblies, indicated generally at 25 and 25', which are conventional in the art. As shown by the dotted lines in FIG. 1, the lower ends of the web portions 21 and 21' of the brake shoes 20 and 20' are slightly curved. The curved lower ends of the web portions 21 and 21' are received between the backing plate 11 and the retainer plate 17 and extend into abutment with the opposed side surfaces of the spacer plate 16. A first coiled spring 26 has hooked ends which extend through respective openings formed through the lower ends of the web portions 21 and 21' so as to urge such lower ends thereof into abutment with the opposed side surfaces of the spacer plate 16.

The drum brake assembly 10 further includes service brake mechanism for actuating the drum brake assembly 10 under normal operating conditions. The service brake mechanism includes a hydraulic actuator 30 which is secured to the backing plate 11 between the upper ends of the web portions 21 and 21' of the brake shoes 20 and 20', respectively. The hydraulic actuator 30 includes a pair of opposed pistons 31 and 32 which respectively abut the upper ends of the web portions 21 and 21'. A second coiled spring 33 has hooked ends which extend through respective openings formed through the upper ends of the web portions 21 and 21' so as to urge such upper ends thereof into abutment with the pistons 31 and 32. The hydraulic actuator 30 is connected to a conventional source of pressurized hydraulic or pneumatic fluid (not shown) for operating the drum brake assembly 10.

The brake drum assembly 10 further includes a hollow cylindrical brake drum 40 which is secured to a wheel (not shown) of the vehicle for rotation therewith. The interior of the brake drum defines a cylindrical braking surface 41. When installed, the brake drum 40 is disposed adjacent to the backing plate 11 such that the brake shoes 20 and 20' extend within the cylindrical braking surface 41. To effect braking action, the brake shoes 20 and 20' are moved outwardly apart from one another so as to frictionally engage the cylindrical braking surface 41 of the brake drum 40. Such frictional engagement causes slowing or stopping of the rotational movement of the brake drum 40 and, therefore, the wheel of the vehicle in a controlled manner.

The hydraulic actuator 30 is used to operate the brake drum assembly 10 under normal service conditions. When it is desired to actuate the drum brake assembly 10, pressurized hydraulic or pneumatic fluid is supplied to the hydraulic actuator 30. Typically, this is accomplished by the operator of the vehicle depressing the brake pedal in the driver compartment of the vehicle. When such pressurized hydraulic or pneumatic fluid is supplied to the hydraulic actuator 30, the pistons 31 and 32 are moved apart from one another. As a result, the upper ends of the brake shoes 20 and 20' are also moved apart from one another, essentially pivoting about the abutment block assembly 15. This movement causes the friction pads 23 and 23' to move into frictional engagement with the cylindrical braking surface 41 of the brake drum 40. The abutment block assembly 15 functions to transfer the braking torque from the leading brake shoe (i.e., the left brake shoe 20 when the brake drum 40 is rotating in a counter-clockwise direction) to the frame of the vehicle. When the brake shoes 20 and 20' are moved apart from one another, the second coiled spring 33 is expanded. Thus, when the pressurized hydraulic or pneumatic fluid to the hydraulic actuator 30 is subsequently released, the second coiled spring 33 retracts the brake shoes 20 and 20' inwardly toward one another and out of frictional engagement with the cylindrical braking surface 41 of the brake drum 40.

The drum brake assembly 10 also includes an automatic adjusting mechanism to compensate for thinning of the friction pads 23 and 23' resulting from wear caused by repeated use. The illustrated automatic adjusting mechanism is conventional in the art and includes a pair of mutually threaded struts 42 and 43 having opposed slotted ends. The upper ends of the web portions 21 and 21' of the brake shoes 20 and 20', respectively, are received within the slotted ends of the struts 42 and 43. A star wheel portion 42a is formed integrally on the strut 42. An adjuster lever 44 is pivotally mounted on the web portion 21 of the brake shoe 20. The adjuster lever 44 has a protruding arm portion 44a which extends into cooperation with the star wheel portion 42a of the strut 42. A third coiled spring 45 has hooked ends which extend through respective openings formed through the adjuster lever 44 and the lower end of the web portion 21 so as to urge the protruding arm portion 44a of the adjuster lever 44 into engagement with the star wheel portion 42a of the strut 42.

As is known, when the brake shoes 20 and 20' are moved outwardly apart from one another such that the friction pads 23 and 23', respectively, frictionally engage the cylindrical braking surface 41 of the brake drum 40, the adjusting lever 44 is pivoted. When a sufficient amount of wear has occurred on the friction pads 23 and 23', the adjusting lever 44 will be pivoted a sufficient amount so as to rotate the star wheel portion 42a and the strut 42 relative to the strut 43. Such relative rotation causes the opposed ends of the struts 42 and 43 to be moved slightly farther apart from one another, together with the associated upper ends of the brake shoes 20 and 20'. Thus, the automatic adjusting mechanism functions to maintain a predetermined clearance A, shown in FIGS. 8 and 9, between the friction pads 23 and 23' of the brake shoes 20 and 20', respectively, and the cylindrical braking surface 41 of the brake drum 40 as wear occurs during operation of the drum brake assembly 10.

In addition to the service brake mechanism described above, the drum brake assembly 10 of this invention further includes a mechanically actuated parking and emergency brake mechanism. The parking and emergency brake mechanism includes an actuating lever, indicated generally at 50. The actuating lever 50 is pivotally supported on the web 21' of brake shoe 20 by a pivot pin assembly which includes a pivot pin 51 having an enlarged head and a reduced diameter body. The body of the pivot pin 51 is inserted through respective aligned apertures formed through the actuating lever 50 and the web portion 21' of the brake shoe 20'. An E-clip 52 is then installed in a groove formed about the end of the body of the pivot pin 51 to retain it in the apertures such that the actuating lever 50 is pivotally supported on the brake shoe 20'. The actuating lever 50 further includes an upstanding pin 53, and a hooked lower end portion 54. The hooked end portion 54 facilitates the connection of one end of an actuating cable 55 thereto. The actuating cable 55 is conventional in the art and is connected to a hand operated lever (not shown) or similar manually operable parking and emergency brake mechanism for selectively actuating the drum brake assembly 10. The construction of the drum brake assembly 10 thus far described is conventional in the art.

Turning now to FIGS. 2 through 6, the structure of a brake shoe wear and automatic brake adjusting indicating device, indicated generally at 60, will be discussed. The indicating device 60 includes an actuating lever 61, a conical spring 62, a tension spring 63, and an indication dial 64. The actuating lever 61 includes a first arm 80, a second arm 81, and a third arm 83. The actuating lever 61 further includes a first aperture 65 (see FIG. 3) and a smaller second aperture 66 (see FIG. 4) formed therethrough.

Figure 3:
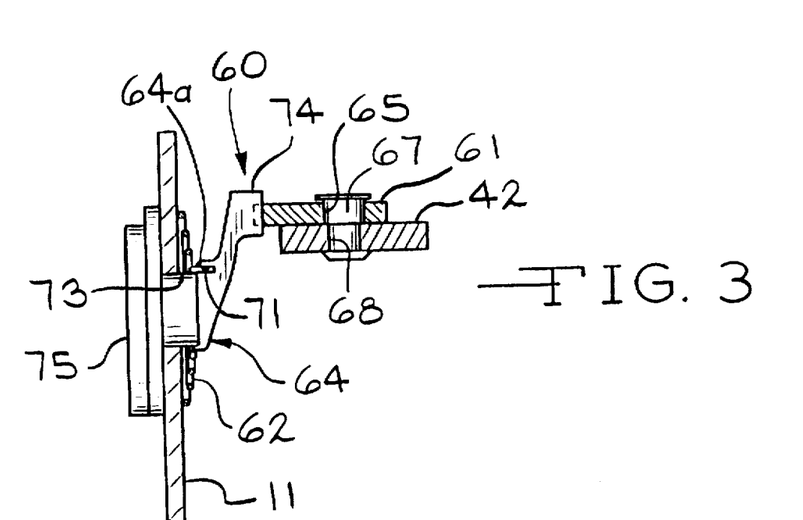
FIG. 3 is a cross sectional view taken along line 3—3 of FIG. 2.
Figure 4:
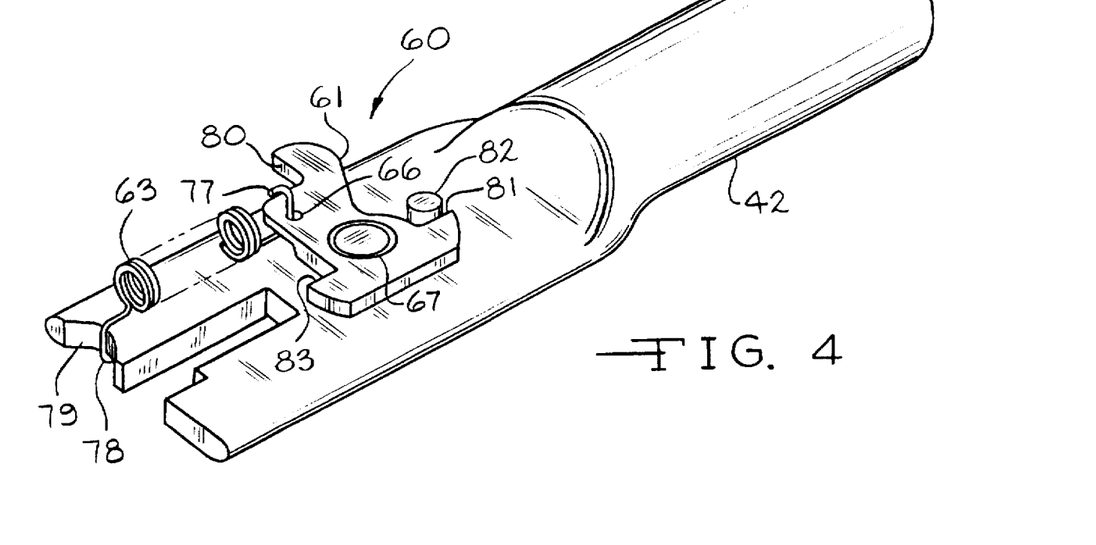
FIG. 4 is a perspective view of a first portion of the brake shoe wear and brake adjusting indicating device illustrated in FIG. 1.

The actuating lever 61 is pivotally supported on the strut 42 of the automatic adjusting mechanism by a pivot pin 67. The pivot pin 67 extends through the aperture 65 of the actuating lever 61 and through an aperture 68 formed in the strut 42. The pivot pin 67 includes a flanged first end and is secured in place by an appropriate means, such as for example, by bending or "peening" over a second end thereof, as shown in FIG. 3.

Figure 5:
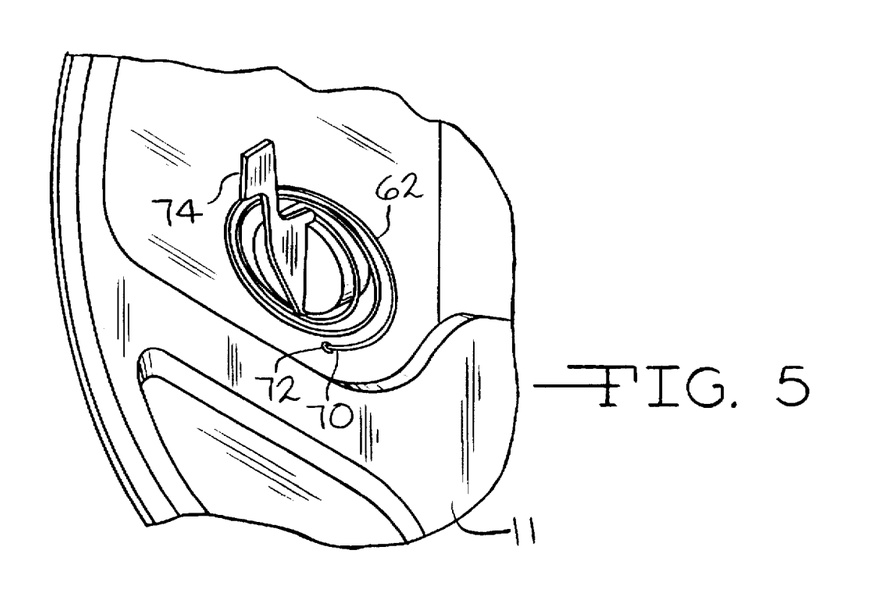
FIG. 5 is a perspective view of a second portion of the brake shoe wear and brake adjusting indicating device illustrated in FIG. 1.

The conical spring 62 includes an outer end portion 70 and an inner end portion 71. The spring end portions 70 and 71 extend generally perpendicular to a plane defined by the wound main body portion of the spring 62 in opposite directions relative to one another. The end of the inner end portion 71 of the spring 62 is disposed in a notched opening 64a formed in the indication dial 64, and the end of the outer end portion 70 of the spring 62 is disposed in an opening 72 provided in the backing plate 12 of the drum brake assembly 10, as shown in FIG. 5.

The indication dial 64 extends through an enlarged opening 73 formed in the backing plate 11 of the brake assembly 10. The indication dial 64 includes an inboard arm 74, and an outboard dial 75. As shown in this embodiment, the outboard dial 75 includes a half-moon cut-out portion 76, and the backing plate 11 is provided with colored generally circular-shaped indicia, labeled in FIG. 6 as "N", "W", and "M". As will be discussed in connection with the operation of the illustrated embodiment of the indicating device 60, N is operative to indicate a normal or neutral condition of the assembly 60, W is operative to indicate that the brake shoe friction pads are worn, and M is operative to indicate that the automatic brake adjusting mechanism is not functioning properly.

The tension spring 63 includes a first hooked end 77 which is disposed in the aperture 66 of the actuating lever 61, and a second hooked end 78 which is disposed in a notch 79 formed in an end of the strut 42. As will be discussed, the tension spring 63 is effective to maintain a predetermined distance B (shown in FIGS. 8, 9, and 10) defined between an edge 21a of the web 21 of the brake shoe 20 and an end 83a of the arm 83 of the actuating lever 61. This predetermined distance B is slightly greater than the clearance A between the friction pads 23 and 23' of the brake shoes 20 and 20', respectively, and the cylindrical braking surface 41 of the brake drum 40.

The conical spring 62 biases the inboard arm 74 of the indication dial 64 in a clockwise direction against the first arm 80 of the actuating lever 61, when viewing FIG. 5, FIGS. 7 through 12, and FIGS. 7A through 12A. The tension spring 63, on the other hand, normally biases the actuating lever 61 in a counterclockwise direction, when viewing FIGS. 7 through 12, and FIGS. 7A through 12A. As a result, the first arm 80 of the actuating lever 61 engages the inboard arm 74 of the indication dial 64, the second arm 81 of the actuating lever 61 engages a stop 82 provided on the strut 43, and the third arm 83 of the actuating lever 61 engages the web 21 of the brake shoe 20.

Turning now to FIGS. 7 through 12, the operation of the brake shoe wear and automatic adjuster malfunction indicating device 60 of the present invention will now be discussed.

Figure 6:
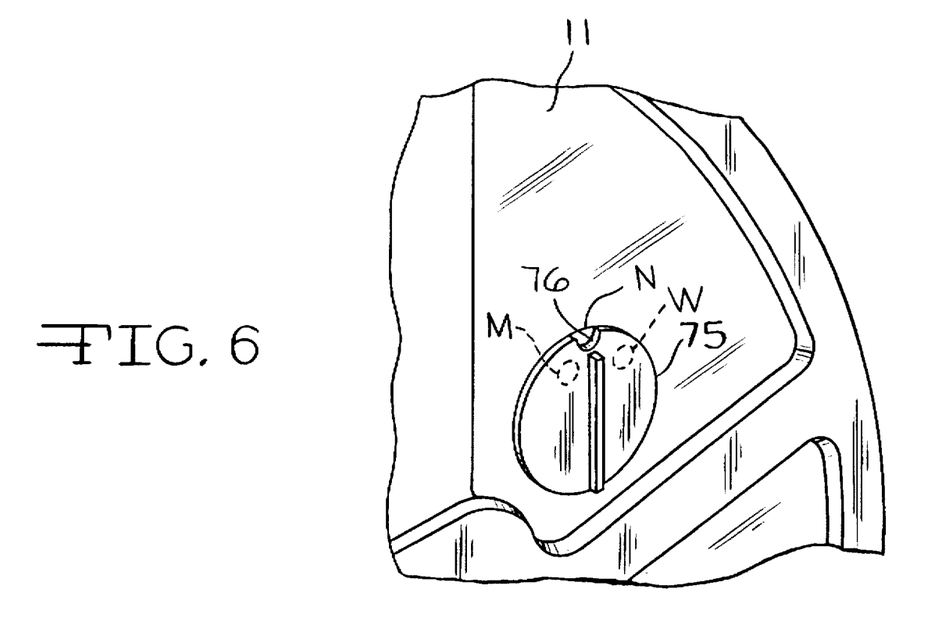
FIG. 6 is a perspective view of a third portion of the brake shoe wear and brake adjusting indicating device illustrated in FIG. 1.
Figures 7, 7A:
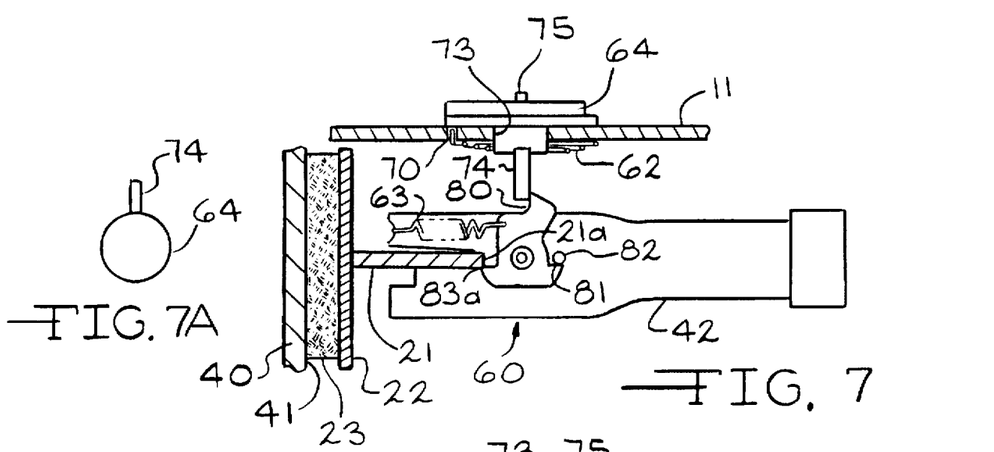
FIG. 7 is a cross sectional view, generally taken along line 7—7 of FIG. 2, illustrating the position of the brake shoe wear and brake adjusting indicating lo device when the brake pads are new, the brake adjusting mechanism is properly functioning, and the drum brake assembly is actuated.
FIG. 7A is a schematic view illustrating the position of an arm of an indication dial of the brake shoe wear and brake adjusting indicating device illustrated in FIG. 7.
Figures 8, 8A:
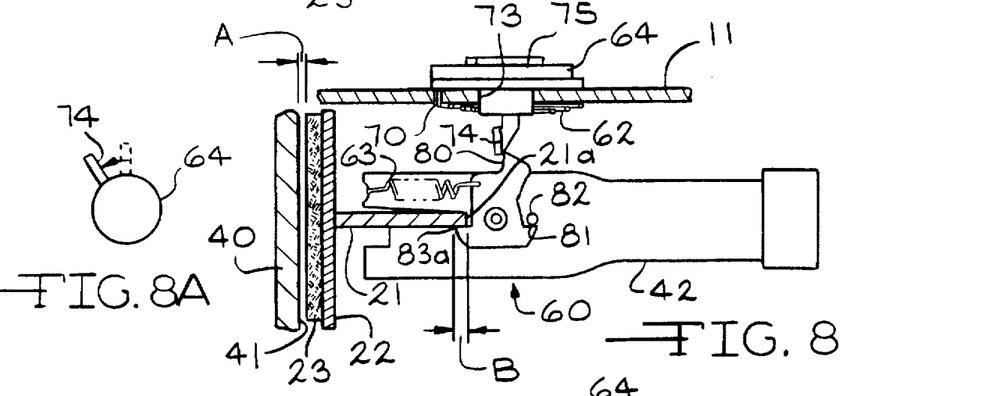
FIGS. 8 and 9 are views similar to FIG. 7 illustrating the positions of the brake shoe wear and brake adjusting indicating device as the brake pads wear.
FIGS. 8A and 9A are views similar to FIG. 7A illustrating the positions of the arm of the indication dial of the brake shoe wear and brake adjusting indicating device as the brake pads wear.
Figures 9, 9A:
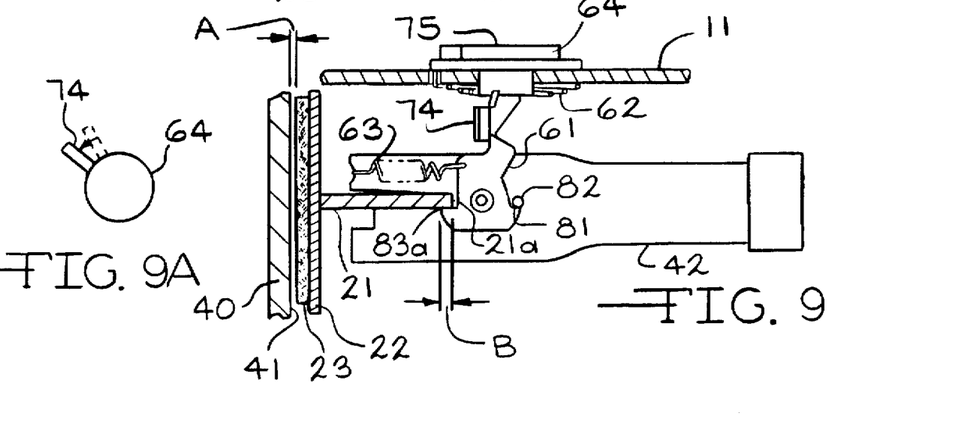

First, referring to FIGS. 7 through 9, the operation of the indicating device 60 will be discussed when the automatic adjusting mechanism is properly functioning and as the brake shoe friction pads 23 and 23' wear. As shown in FIG. 7, when the friction pads 23 and 23' are new and drum brake assembly 10 is actuated, the brake shoes 20 and 20' are moved outwardly so that the respective friction pad 23 and 23' frictionally engage the cylindrical braking surface 41 of the brake drum 40 (only brake shoe 20 and friction pad 23 are shown in FIG. 7). During this movement, the brake shoe 20 moves to the left in FIG. 7 taking up the clearance A, which is shown in FIGS. 8 and 9. As discussed above, the predetermined distance B is slightly greater than the clearance A. Thus, the edge 21a of the web 21 of the brake shoe 20 remains in contact against the arm 83 of the actuating lever 61, as shown in FIG. 7. When the indicating device 60 is in the position shown in FIG. 7, the arm 74 of the indication dial 64 is oriented at the twelve O'clock position shown in FIG. 7A. Thus, the cut-out 76 in the dial face 75 is concentric with the "N" circle on the backing plate 11, as shown in FIG. 6, thereby providing a visual indication that the indicating device 60 is in a normal condition.

FIG. 8 shows an intermediate condition wherein the friction pads 23 and 23' have worn to approximately half of their useful life. As shown therein, the strut 42 has moved to the left in FIG. 8 from the position shown in FIG. 7 in order to maintain the clearance A between the friction pads 23 and 23' and the cylindrical braking surface 41 of the brake drum 40. As a result of the movement of the strut 42, the arm 80 of the actuating lever 61 rotates the arm 74 of the indication dial 64 in a counterclockwise direction to the eleven O'clock position shown in FIG. 8A. Also, as shown in FIG. 8, the predetermined distance B is maintained between the edge 21a of the web 21 of the brake shoe 20 and the end 83a of the arm 83 of the actuating lever 61.

FIG. 9 shows the condition when the friction pads 23 and 23' have fully worn and should be replaced. As shown therein, the strut 42 has moved further to the left from the position shown in FIG. 8 in order to maintain the clearance A between the friction pads 23 and 23' and the cylindrical braking surface 41 of the brake drum 40. As a result of this further movement of the strut 42, the arm 80 of the actuating lever 61 further rotates the arm 74 of the dial 64 in a counterclockwise direction to the ten O'clock position shown in FIG. 9A. In this position, the cut-out 76 in the dial face 75 is concentric with the W circle on the backing plate 11, thereby providing a visual indication that the friction pads 23 and 23' are worn and should be replaced. Also, as shown in FIG. 9, the predetermined distance B is maintained between the edge 21a of the web 21 of the brake shoe 20 and the end 83a of the arm 83 of the actuating lever 61.

Figures 10, 10A:
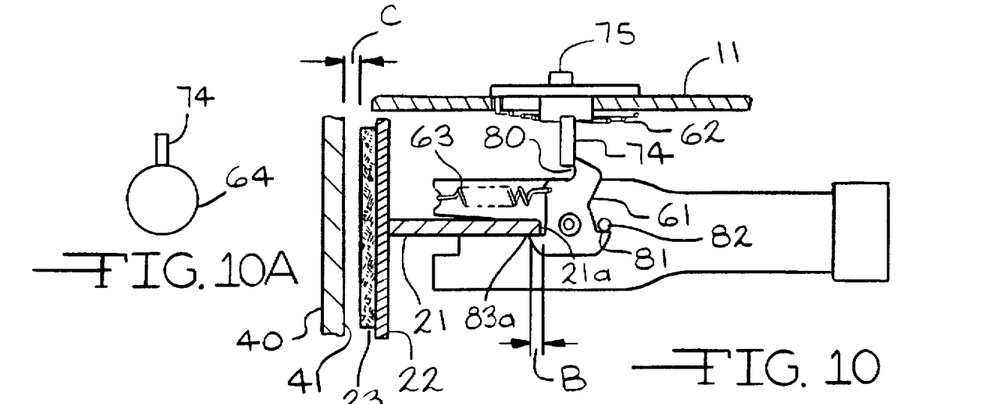
Figures 11, 11A:
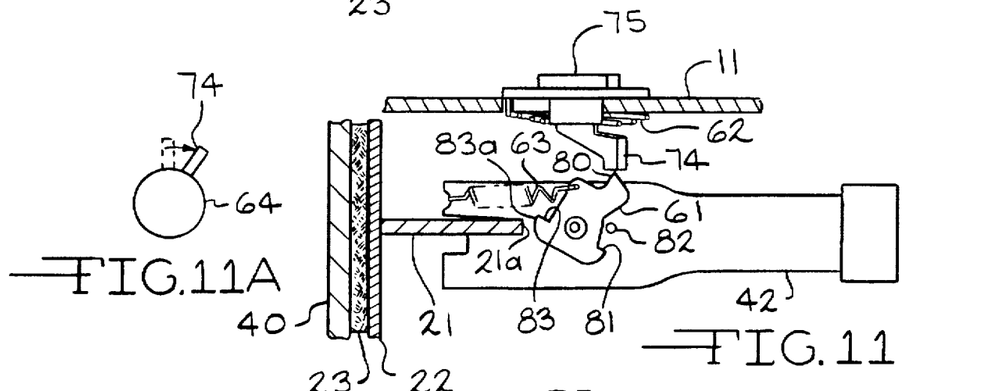

Turning now to FIGS. 10 through 11, the sequence of operation of the indicating device 60 will be discussed when the friction pads 23 and 23' have sufficiently worn to require the automatic adjusting mechanism to be actuated, but the automatic adjusting mechanism is not properly functioning. As shown in FIG. 10, the friction pads 23 and 23' have worn, but the automatic adjusting mechanism is not properly functioning to maintain the clearance A shown in FIGS. 8 and 9. Rather, a clearance C (larger than the clearance A) is defined is between the friction pads 23 and 23' and the cylindrical braking surface 41 of the brake drum 40. The clearance C is substantially equal to the predetermined distance B. As a result of this condition, the arm 74 of the indication dial 64 is in the twelve O'clock position shown in FIG. 10A, which indicates a "false" normal condition, instead of being in the position shown in FIG. 8A.

Figures 12, 12A:
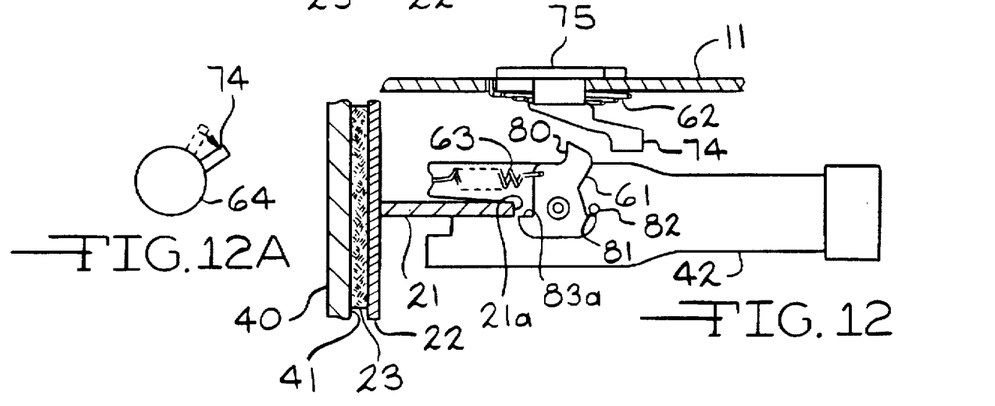

As soon as the friction pads 23 and 23' wear slightly more so that clearance C is greater than predetermined distance B and the drum brake assembly 10 is actuated, the sequence of operation shown in FIGS. 11 and 12 will occur. As shown in FIG. 1, when the drum brake assembly 10 is actuated, the edge 21a of the web 21 of the brake shoe 20 will no longer engage the arm 83 of the actuating lever 61. Because the conical spring 62 is stronger than the tension spring 63, the conical spring 62 initially rotates the arm 74 of the indication dial 64 in a clockwise direction. Thus, the arm 74 in turn rotates the first arm 80 of the actuating lever 61 in a clockwise direction.

The arm 74 continues to rotate in a clockwise direction under the force of the conical spring 62 until the arm 74 is moved out of engagement with the first arm 80 of the lever 61, as shown in FIG. 11. Once the arm 74 of the indication dial 64 no longer engages the first arm 80 of the lever 61, the tension spring 63 is operative to return the actuating lever 61 to the position shown in FIG. 12. It will be appreciated that the operation and movement of the actuating lever 61 shown in FIGS. 11 and 12 occurs very rapidly, as well as the corresponding movement of the arm 74 of the indication dial 64 shown in FIGS. 1 1A and 12A. As a result of the sequence of operation shown in FIGS. 10 through 12, the cut-out 76 in the dial face 75 is rotated so as to be concentric with the M circle on the backing plate 11 so as to provide a visual indication that the automatic adjuster mechanism is not properly functioning.

While the present invention has been described and illustrated as using a specific indicating device 60, other structures can be used in connection with the present invention. For example, the structure of the indication dial can include other means for visually indicating when the brake friction pads are worn and when the automatic brake adjusting mechanism is not properly functioning.

Figure 13:
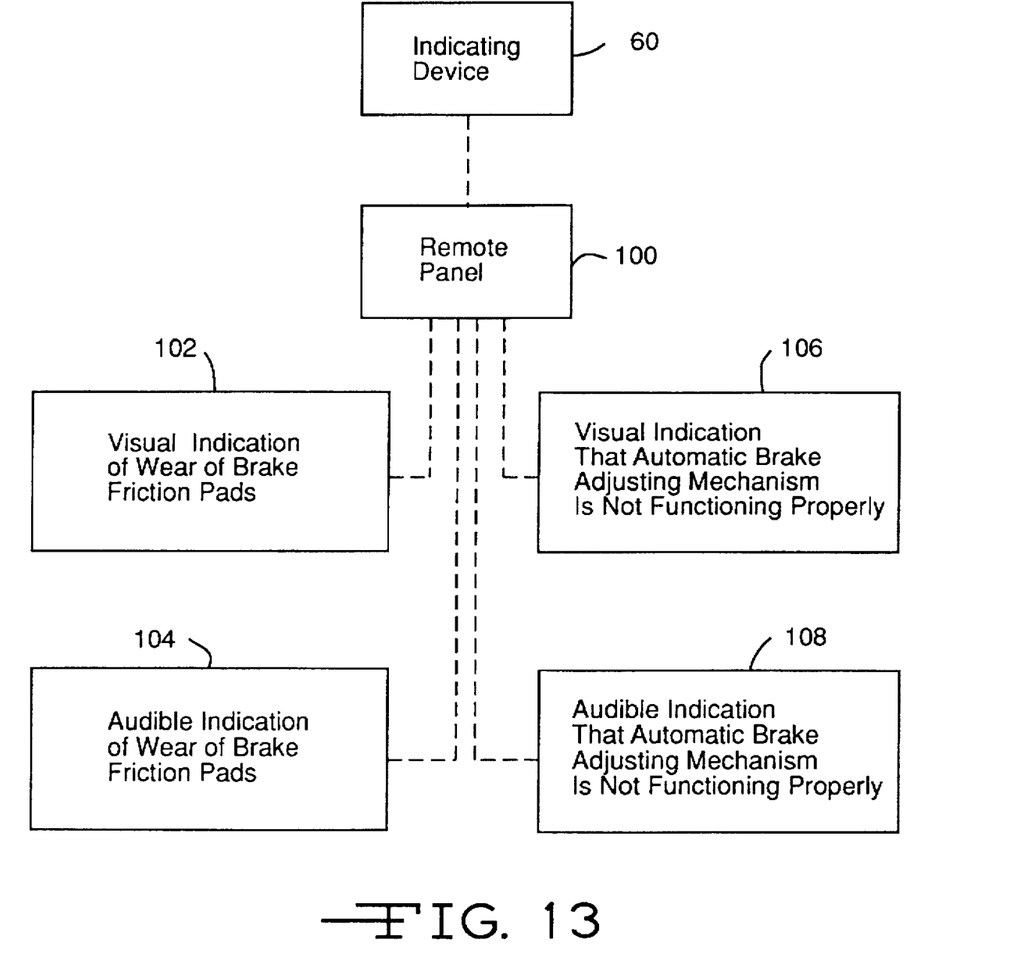
FIG. 13 is a schematic diagram illustrating an alternate embodiment of the brake shoe wear and brake adjusting indicating device in accordance with this invention.

Also, as shown schematically in FIG. 13, the structure of the indicating device 60 can be operative to generate an electrical signal to a remote panel 100, which can be located in the dashboard of the vehicle, to indicate visually and/or audibly when the brake friction pads are worn, as shown in respective boxes 102 and 104, and when the automatic adjusting mechanism is not properly functioning, as shown in respective boxes 106 and 108.

Although the invention has been described and illustrated in connection with a leading/trailing type of drum brake assembly 10, it will be appreciated that this invention may be used in connection with types of drum brake assemblies. For example, this invention may be used in a "dual mode" drum brake assembly wherein the service brake is of the leading/trailing type and the parking and emergency brake is of the duo-servo type.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A drum brake assembly adapted to selectively frictionally engage a brake drum comprising:

a backing plate supported relative to a vehicle component;

first and second brake shoes supported on said backing plate for selective movement into frictional engagement with the brake drum;

a service brake mechanism for selectively moving said brake shoes into frictional engagement with the brake drum;

a parking and emergency brake mechanism for selectively moving said brake shoes into frictional engagement with the brake drum, said parking and emergency brake mechanism includes an actuating lever pivotally supported on one of said brake shoes, said lever adapted to be operatively connected to a manually operable parking and emergency brake mechanism for selectively moving said brake shoes into frictional engagement with said brake drum when said parking and emergency brake mechanism is actuated;

an automatic brake adjusting mechanism carried by said drum brake assembly and operatively connected to said first and second brake shoes, said automatic adjusting mechanism includes a pair of mutually threaded struts, a star wheel, an adjuster lever, and a coiled spring, said struts having opposed slotted ends adapted to receive associated ends of said brake shoes, said adjuster lever having a protruding arm portion which extends into cooperation with said star wheel, and said coiled spring having hooked ends which extend through respective openings formed through said adjuster lever and one of said brake shoes thereby urging said protruding arm portion of said adjuster lever into engagement with said star wheel;

first indicating means carried by said brake assembly for indicating an operating condition of said brake shoes; and second indicating means carried by said brake assembly for indicating an operating condition of said automatic brake adjusting mechanism;

wherein said first indicating means and said second indicating means form a combined brake wear and adjuster malfunction indicating assembly; said combined brake wear and adjuster malfunction indicating assembly includes an actuating lever, a conical spring, a tension spring, and an indication member.

2. The drum brake assembly defined in claim 1 wherein said actuating lever includes a first arm, a second arm, a third arm, a first aperture, and a second aperture.

3. The drum brake assembly defined in claim 2 wherein said actuating lever is pivotally supported on one of said struts of said automatic adjusting mechanism.

4. The drum brake assembly defined in claim 3 wherein said conical spring includes an outer end portion and an inner end portion, said outer end disposed in an opening formed in the indication member, said outer end portion disposed in an opening provided in said backing plate.

5. The drum brake assembly defined in claim 4 wherein said indication member extends through an opening formed in said backing plate.

6. The drum brake assembly defined in claim 1 wherein said indication member includes an inboard arm and an outboard dial, said outboard dial having a cut-out portion and said backing plate having indicia means which is visible through said cut-out portion to indicate one of three conditions, a first condition being a normal condition, a second condition being that said brake shoes are worn, and a third condition being that said automatic brake adjusting mechanism is not functioning properly.

7. The drum brake assembly defined in claim 1 wherein said tension spring includes a first hooked end disposed in said aperture of said actuating lever, and a second hooked end disposed in a notch formed in an end of said one of said struts.

8. The drum brake assembly defined in claim 1 wherein said drum brake assembly is a leading/trailing type of drum brake assembly.

9. The drum brake assembly defined in claim 1 wherein said drum brake assembly is a dual mode type of drum brake assembly.

10. The drum brake assembly defined in claim 1 wherein said drum brake assembly is a duo-servo type of drum brake assembly.

11. The drum brake assembly defined in claim 1 wherein said first indicating means and said second indicating means provide a visual indication of the respective operating conditions of said brake shoes and said automatic brake adjusting mechanism.

12. The drum brake assembly defined in claim 1 wherein said first indicating means and said second indicating means provide an audible indication of the respective operating conditions of said brake shoes and said automatic brake adjusting mechanism.

13. The drum brake assembly defined in claim 1 wherein said first indicating means and said second indicating means provide both an audible and a visual indication of the respective operating conditions of said brake shoes and said automatic brake adjusting mechanism.

14. A drum brake assembly adapted to selectively frictionally engage a brake drum comprising:

a backing plate supported relative to a vehicle component;

first and second brake shoes supported on said backing plate for selective movement into frictional engagement with the brake drum;

a service brake mechanism for selectively moving said brake shoes into frictional engagement with the brake drum;

a parking and emergency brake mechanism for selectively moving said brake shoes into frictional engagement with the brake;

an automatic brake adjusting mechanism carried by said drum brake assembly and operatively connected to said first and second brake shoes;

a combined brake wear and brake adjuster malfunction indicating assembly comprising first and second sets of components carried by said backing plate and said brake adjusting mechanism respectively;

wherein said first and second sets of components mechanically cooperate to provide automatic indication of the wear of the brake pads or the operating condition of the brake adjusting mechanism, dependent upon whether or not said adjusting mechanism is functioning properly, without removal of a vehicle brake drum.

15. The drum brake assembly defined in claim 14 wherein said automatic indicating assembly visually indicates the extent of wear of said brake shoes or that said automatic brake adjusting mechanism is not functioning properly.

16. The drum brake assembly defined in claim 14 wherein said automatic indicating assembly audibly indicates the extent of wear of said brake shoes or that said automatic brake adjusting mechanism is not functioning properly.

17. The drum brake assembly defined in claim 14 wherein said automatic indicating assembly audibly and visually indicates the extent of wear of said brake shoes or that said automatic brake adjusting mechanism is not functioning properly.

* * * * *